United States Patent [19]
Freiheit

[11] Patent Number: 5,884,778
[45] Date of Patent: Mar. 23, 1999

US005884778A

[54] FOLDING WINDOW RACK

[76] Inventor: Robert Freiheit, 11728 Johnson Lake Rd., Lakeside, Calif. 92040-1048

[21] Appl. No.: 990,546

[22] Filed: Dec. 15, 1997

[51] Int. Cl.⁶ .......................................................... A47F 7/00
[52] U.S. Cl. ........................ 211/41.14; 206/448; 211/195; 224/314; 224/403
[58] Field of Search ................................ 211/41.14, 195, 211/198, 41.15, 194, 41.1; 206/448, 454; 224/537, 314, 403, 402

[56] References Cited

U.S. PATENT DOCUMENTS

| | | | |
|---|---|---|---|
| 2,946,453 | 7/1960 | Pityo | 211/41.14 |
| 2,956,763 | 10/1960 | D'Arca | 211/195 X |
| 4,093,251 | 6/1978 | Boyer | 211/41.14 X |
| 4,778,064 | 10/1988 | Gold | 211/41.14 |
| 4,899,891 | 2/1990 | Sipila et al. | 211/41.14 |
| 5,169,011 | 12/1992 | Ebeling et al. | 211/195 |
| 5,465,883 | 11/1995 | Woodward | 211/41.14 X |

*Primary Examiner*—Robert W. Gibson, Jr.
*Attorney, Agent, or Firm*—Calif Tervo

[57] ABSTRACT

A folding rack (10) for holding glass panels, particularly automobile glass panels (93), includes a pair of horizontal, spaced-apart rails (20). Holders (60) for holding glass (93) are connected by hinges (40) to the ends of rails (20) by a horizontal hinge axis (45) and are rotatable between an erect position and a folded position. Right posts (70R) are of length such that in the folded position their upper ends (72R) are near the left hinge axis (45L). In the upright position, bottom ends (71L) of left posts (70L) being disposed to the left of the left hinge axis (45L) such that in the folded position they are higher than in the upright position such that left holder (60L) folds over right holder (60R).

16 Claims, 2 Drawing Sheets

FOLDING WINDOW RACK

FIELD OF THE INVENTION

This invention relates in general to racks for holding glass panels and more specifically to a folding rack for holding automobile glass.

BACKGROUND OF THE INVENTION

Persons installing glass panels for home and business may also install automobile glass. The large flat glass panels for home or business are commonly carried on side racks on a truck and the truck cargo area carries the ladders and other materials of installation. The curved automobile windshield glass is transported in a separate rack in the truck cargo area. Heretofore, the rack for automobile glass has been a stationary rack that takes up considerable space when not in use.

Therefore, there has been a need for a rack for automobile windshields that is foldable to a less obtrusive size when not in use.

SUMMARY OF THE INVENTION

Figure 1:
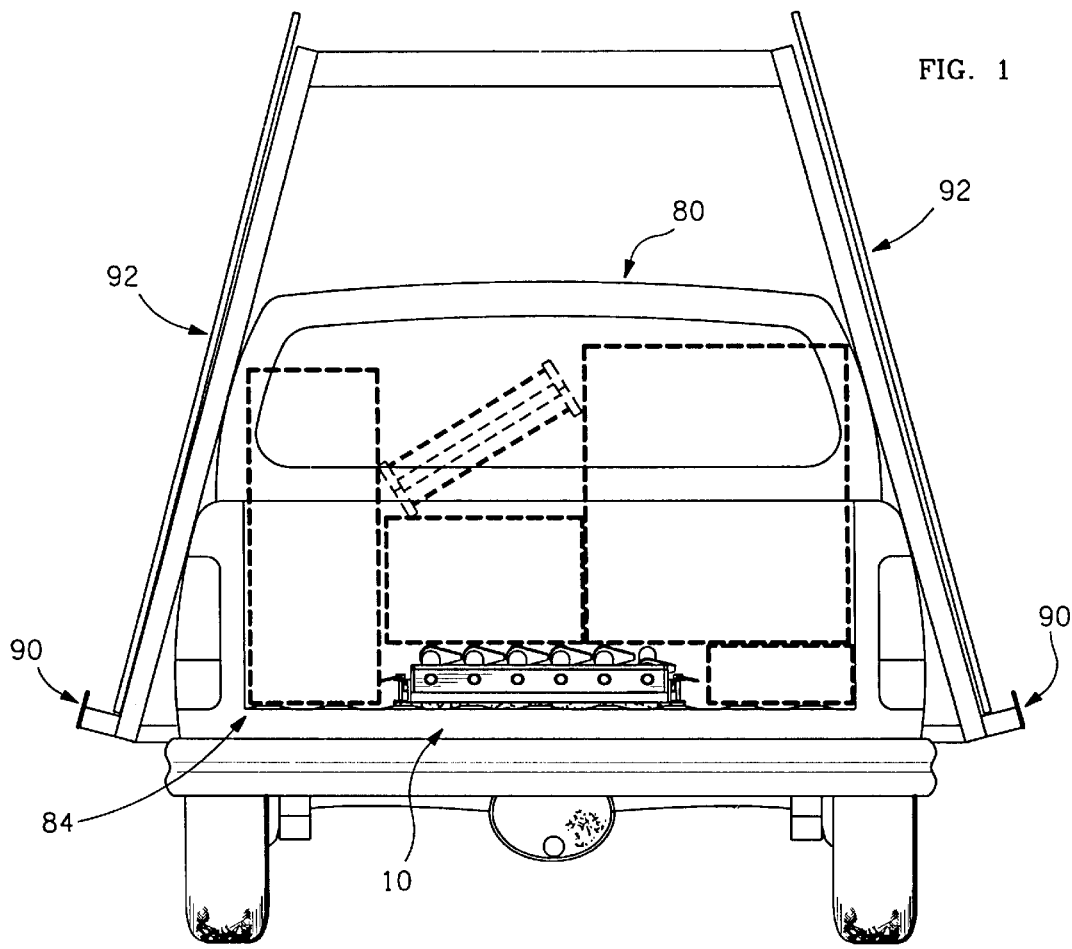
FIG. 1 is a view of the environment of the folding window rack of the invention showing a right side elevation view of preferred embodiment of the invention in the folded position.

This invention is folding rack for holding glass panels, particularly automobile glass panels. The rack includes a pair of horizontal, spaced-apart rails each having a base, a right end and a left end. A right hinge, hingedly connected to right ends of the rails, has a horizontal hinge axis and is rotatable between an erect position and a folded position. A left hinge, hingedly connected to the left ends of the rails, has a horizontal hinge axis parallel to and at substantially that same height as the right hinge axis and is rotatable between an erect position and a folded position.

A right holder is attached to the right hinge and is rotatable therewith between the upright position and the folded position. The right holder comprises a right cross bar and a plurality of right posts. The right cross bar is attached to the right hinge and pivotable therewith and substantially traverses between the rails and has a horizontal longitudinal axis parallel to the right hinge axis. The right posts each have a bottom end connected to the right cross bar and project orthogonally thereto and terminate in an upper end. Posts spaced apart so as to accept a glass panel therebetween. Posts project substantially upward in the upright position and substantially horizontally in the folded position. The right posts having a length such that in the folded position their upper ends are near the left hinge axis.

A left holder is attached to the left hinge and is rotatable therewith between the upright position and the folded position. The left holder comprises a left cross bar and left posts. The left cross bar is attached to the left hinge and is pivotable therewith and substantially traverses between the rails and has a horizontal longitudinal axis parallel to the left hinge axis. The left posts each correspond to a right post and have a bottom end connected to the left cross bar and project orthogonally thereto and terminate in an upper end. In the upright position, the bottom ends of the left posts being disposed to the left of the left hinge axis such that in the folded position they are higher than in the upright position such that the left holder folds over the right holder.

Other features and many attendant advantages of the invention will become more apparent upon a reading of the following detailed description together with the drawings in which like reference numerals refer to like parts throughout.

DETAILED DESCRIPTION OF THE INVENTION

FIG. 1 is a view of a typical environment of the folding window rack 10 of the invention. A truck 80 for delivering and installing glass is shown in rear view. Side racks 90 carry large glass panels for homes or business. Rear bed 84 carries glass installation materials, ladders, etc. A right side elevation view of a preferred embodiment of window rack 10 is shown not in use and in the folded position. As can be seen, rack 10 folds when not in use so as to be unobtrusive and non-obstructive to the other uses of rear bed 84 such that it does not have to be removed when not in use.

Figure 4:
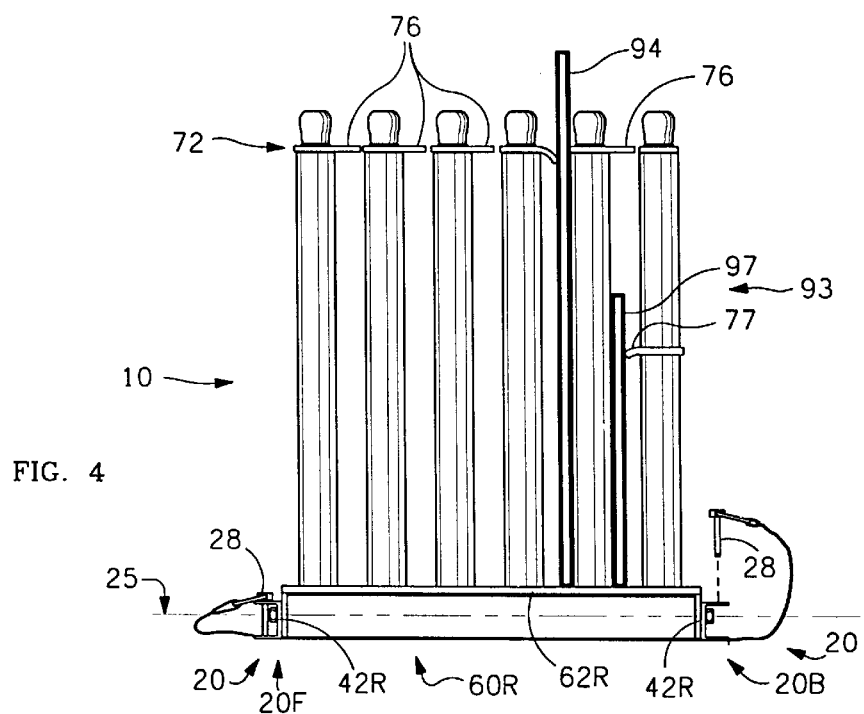
FIG. 4 is a right end elevation view of FIG. 2.
Figure 3:
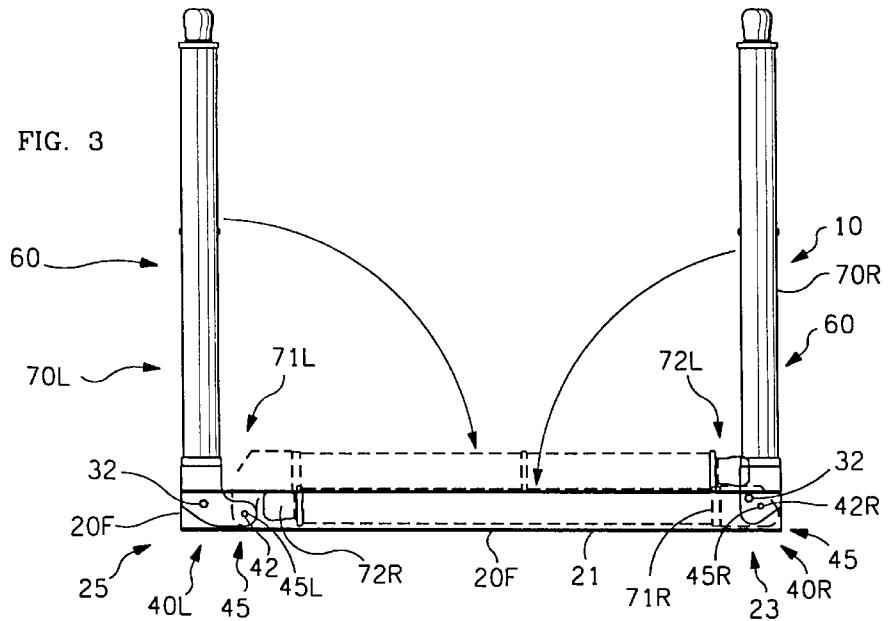
FIG. 3 is a front elevation view of a preferred embodiment of the invention showing the folded position in phantom.
Figure 2:
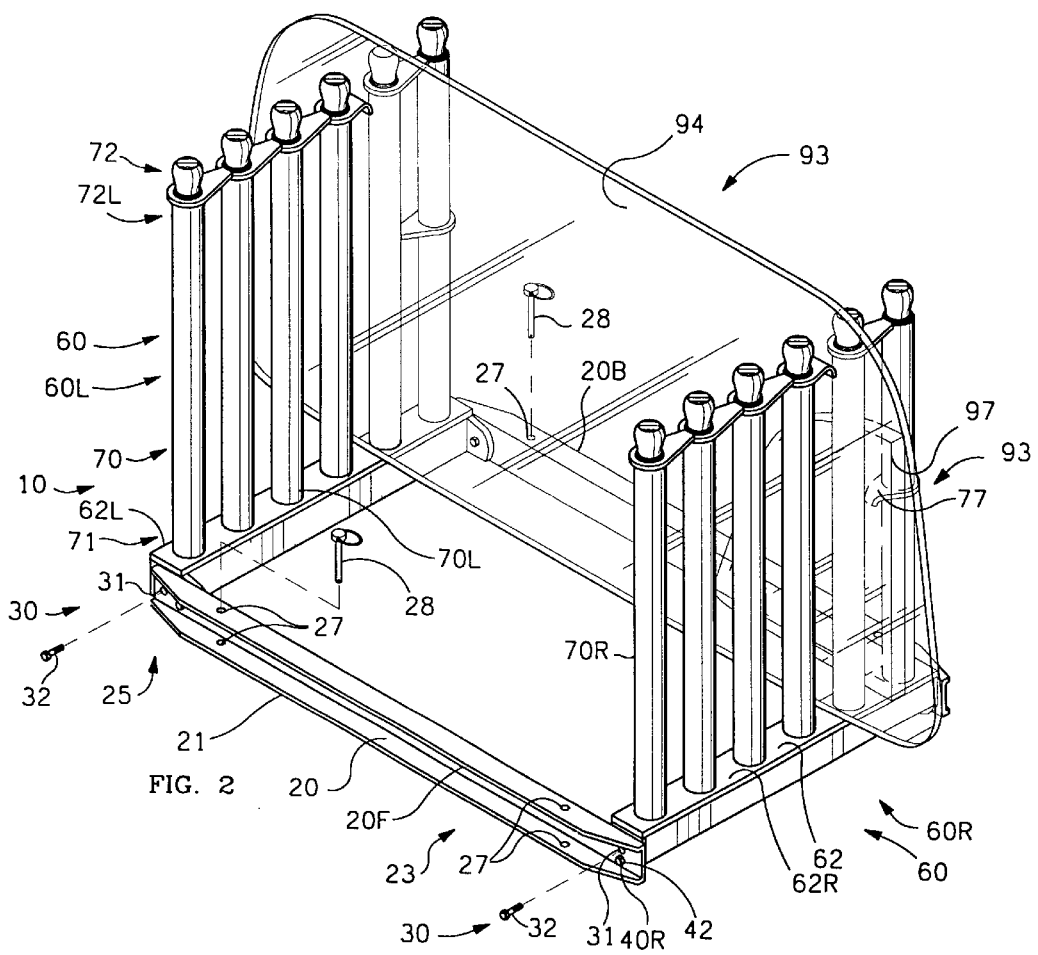
FIG. 2 is a perspective view of the embodiment of FIG. 2 in the erect position with held automobile window glass panels shown in phantom.

Turning now to FIGS. 2–4. There is shown in FIG. 2 a perspective view of a preferred embodiment of the rack 10 of the invention in the erect position with held automobile window glass panels 93 shown in phantom. FIG. 3 is a front elevation view of the embodiment of rack 10 of FIG. 2 showing the folded position in phantom. Rack 10 has two positions: an erect position, shown in solid lines, and a compact folded position, shown in phantom lines. FIG. 4 is a right end elevation view of FIG. 2.

Rack 10 generally comprises a pair of horizontal, spaced-apart rails 20 including front rail 20F and back rail 20B; a pair of hinges 30 including right hinge 30R and left hinge 30L; a pair of holders 40 including a right holder 40R and a left holder 40L; and tethered locking pins 32 for easy change of position.

Each rail 20 has a support base 21 for placement on a support surface, a right end 23 and a left end 25. In the preferred embodiment, rails 20 are aluminum or steel channels having a length of about 75 centimeters and a height of about 4–5 centimeters. Mounting means, such as a plurality of bores 27 in rails 20 each receiving a tethered mounting pin 28, are provided for fastening rack 10 to a support surface, such as to vehicle 80, such as to truck bed 84.

Right hinge 40R hingedly connects right holder 60R to rails 20 proximal right ends 23. A pair of right hinge pins 42R connect right hinge 40R to rails 20 and define a right hinge axis 45R such that right hinge 40R can pivot about the right hinge pins 42R between an erect position shown in FIGS. 2–4 and a folded position shown in FIG. 3 in phantom. Preferably, as shown, the right hinge axis 45R is horizontal.

Left hinge 40L hingedly connects left holder 60L to rails 20 proximal left end 25. A pair of left hinge pins 42L connect left hinge 40L to rails 20 and define a left hinge axis 45L such that left hinge 40L can pivot about the left hinge pins 42L between an erect position shown in FIGS. 2–4 and a folded position, shown in FIG. 3 in phantom. Preferably, as shown, the left hinge axis 45L is parallel to the right hinge axis 45R and at substantially the same height as the right hinge axis 45R.

Each holder 60 generally includes a cross bar 62 and a plurality of posts 70, each having a bottom end 71 and an upper end 72. Locking means 30, such as tethered locking pins 32 are inserted through coaxial bores 31 in side rails 20 and in hinges 40 or holders 60 to lock holders 60 in the upright position.

Right holder 60R is attached to right hinge 40R and rotatable therewith between the upright position and the folded position. Right holder 60R comprises a right cross bar 62R attached to right hinge 40R and pivotable therewith and substantially traversing between rails 20 and having a horizontal longitudinal axis 45R parallel to the right hinge axis 45R. In the upright position, the top of right cross bar 62R supports the bottom of glass 93.

Right posts 70R each have a bottom end 71R connected to right cross bar 62R. Right posts 70R projecting orthogonally to right cross bar 62R and terminate in an upper end 72R. right posts 70R are spaced apart so as to accept an automobile glass panel 93, such as windshield 94 or vent window 97, therebetween. Right posts 70R have a longitudinal axis and project substantially upward in the upright position and substantially horizontally in the folded position. To move right holder 60R to the folded position, its locking tethered locking pin 32 is removed from its bores 31 and upper ends 72R of right posts 70R are rotated on hinge 40R inward toward left holder 60L. Right posts 70R have a length such that, in the folded position, upper ends 72R are near the left hinge axis 45L. Preferably, the right hinge axis 45R passes substantially through the axes of right posts 70R and is of height above base 21 equal to about a radius of right post 70R such that right holder 60R folds substantially horizontally between rails 20 and touching bed 84.

Left holder 60L is attached to left hinge 40L and rotatable therewith between the upright position and the folded position. Left holder 60L comprises a left cross bar 62L attached to left hinge 40L and pivotable therewith and substantially traversing between rails 20 and having a horizontal longitudinal axis parallel to the left hinge axis 45L. In the upright position, the top of left cross bar 62L supports the bottom of glass 93 at the same height as does right cross bar 62R.

Left posts 70L each correspond to a right post 70R. Each have a bottom end 71L connected to left cross bar 62L and projecting orthogonally thereto and terminating in an upper end 72L and spaced apart so as to accept a glass panel 93 therebetween. Left posts 70L projecting substantially upwardly in the upright position and substantially horizontally inward in the folded position. In the upright position, bottom ends 71L are disposed to the left of the left hinge axis 45L such that, in the folded position, bottom ends 71L are higher than in the upright position. In the upright position, the Posts 70 are spaced such that, with both holders 60 in the folded position, each left post 70L overlies its corresponding right post 70R.

On each holder 60, each adjacent pair of posts 70 and cross bar 62 form a channel for supporting a glass panel 93 in a substantially upright position. The companion channel in the other holder 60 holds the other end of long glass panels, such as automobile windshield glass 94. Thus, in the upright position, holders 60 retain a plurality of glass panels 93 in parallel Preferably, posts 70 are made of strong material, such as aluminum or steel and covered with a shock absorbing material, such as closed-cell foam, to prevent damage to glass 93. Preferably, also, cross bars 62 are covered with shock absorbing material. Resilient flaps 76 on posts 70 are cantilevered to resiliently admit glass 93 into the channel and to hold glass 93 firmly in place against an adjacent post 70 once glass 93 is admitted. Lower flaps 77 are located well below the upper ends 72 of posts 70 for holding a smaller glass panel 93, such as a vent window 97 in a single channel on one holder 60 or a pair of lower flaps may hold a long, but short in height window in channels of two holders 60.

Preferably, hinges 40 are as shown, such that left holder 40L pivots to a higher plane upon folding. However, both hinges 40 may be similar to left hinge 40L which results in only a slightly less compact folded position.

Having described the invention, it can be seen that it provides a very convenient device for holding glass panels.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

In the appended claims, directions, such as horizontal and vertical are meant to be relative and not in the absolute sense.

I claim:

1. A folding rack for holding glass panels; said rack comprising:

a pair of horizontal, spaced-apart rails; each said rail having:
  a base;
  a right end; and
  a left end;
a right hinge hingedly connected to said right ends of said rails; said right hinge having a horizontal hinge axis and being rotatable between an erect position and a folded position;
a left hinge hingedly connected to said left ends of said rails; said left hinge having a horizontal hinge axis parallel to said right hinge axis and being rotatable between an erect position and a folded position;
a right holder attached to said right hinge and rotatable therewith between the upright position and the folded position; said right holder comprising:
  a right cross bar attached to said right hinge and pivotable therewith and substantially traversing between said rails and having a horizontal longitudinal axis parallel to said right hinge axis; and
  a plurality of right posts; each having a bottom end connected to said right cross bar and projecting orthogonally thereto and terminating in an upper end and spaced apart so as to form a channel therebetween for accepting a glass panel; said right posts projecting substantially upward in the upright position and substantially horizontally inward in the folded position; and
a left holder attached to said left hinge and rotatable therewith between the upright position and the folded position; said left holder comprising:
  a left cross bar attached to said left hinge and pivotable therewith and substantially traversing between said rails and having a horizontal longitudinal axis parallel to said left hinge axis; and
  a plurality of left posts; each corresponding to a said right post; each having a bottom end connected to said left cross bar and projecting orthogonally thereto and terminating in an upper end and spaced apart so as to form a channel therebetween for accepting a glass panel; said left posts projecting substantially upwardly in the upright position and substantially horizontally inward in the folded position.

2. The folding rack of claim 1 wherein:

said left posts are spaced such that, with both holders in the folded position, each said left post overlies its corresponding said right post.

3. The folding rack of claim 1 further including:

a low resilient flap attached to a said post distal from said post upper end and projecting across an adjacent said channel toward an adjacent said post for holding a glass panel that is shorter in height than said post in said adjacent channel snugly against said adjacent post.

4. The folding rack of claim 1 further including:

a plurality of high resilient flaps; each resilient flap being attached near the top of a said post and projecting across the top of an adjacent said channel toward an adjacent said post for holding a glass panel in said adjacent channel snugly against said adjacent post.

5. The folding rack of claim 4 further including:

a low resilient flap attached to a said post distal from said post upper end and projecting across an adjacent said channel toward an adjacent said post for holding a glass panel that is shorter in height than said post in said adjacent channel snugly against said adjacent post.

6. The folding rack of claim 2 further including:

a low resilient flap attached to a said post distal from said post upper end and projecting across an adjacent said channel toward an adjacent said post for holding a glass panel that is shorter in height than said post in said adjacent channel snugly against said adjacent post.

7. The folding rack of claim 2 further including:

a plurality of high resilient flaps; each resilient flap being attached near the top of a said post and projecting across the top of an adjacent said channel toward an adjacent said post for holding a glass panel in said adjacent channel snugly against said adjacent post.

8. The folding rack of claim 7 further including:

a low resilient flap attached to a said post distal from said post upper end and projecting across an adjacent said channel toward an adjacent said post for holding a glass panel that is shorter in height than said post in said adjacent channel snugly against said adjacent post.

9. A folding rack for holding glass panels; said rack comprising:
  a pair of horizontal, spaced-apart rails; each said rail having:
    a base;
    a right end; and
    a left end;
  a right hinge hingedly connected to said right ends of said rails; said right hinge having a horizontal hinge axis and being rotatable between an erect position and a folded position;
  a left hinge hingedly connected to said left ends of said rails; said left hinge having a horizontal hinge axis parallel to and at substantially that same height as said right hinge axis and being rotatable between an erect position and a folded position;
  a right holder attached to said right hinge and rotatable therewith between the upright position and the folded position; said right holder comprising:
    a right cross bar attached to said right hinge and pivotable therewith and substantially traversing between said rails and having a horizontal longitudinal axis parallel to said right hinge axis; and
  a plurality of right posts; each having a bottom end connected to said right cross bar and projecting orthogonally thereto and terminating in an upper end and spaced apart so as to form a channel therebetween for accepting a glass panel; said right posts projecting substantially upward in the upright position and substantially horizontally in the folded position; said right posts having a length such that in the folded position said upper ends are near said left hinge axis; and
a left holder attached to said left hinge and rotatable therewith between the upright position and the folded position; said left holder comprising:
  a left cross bar attached to said left hinge and pivotable therewith and substantially traversing between said rails and having a horizontal longitudinal axis parallel to said left hinge axis; and
  a plurality of left posts; each corresponding to a said right post; each having a bottom end connected to said left cross bar and projecting orthogonally thereto and terminating in an upper end and spaced apart so as to form a channel therebetween for accepting a glass panel; said left posts projecting substantially upwardly in the upright position and substantially horizontally inward in the folded position; in the upright position, said bottom ends of said left posts being disposed to the left of said left hinge axis such that in the folded position said bottom ends of said left posts are higher than in the upright position.

10. The folding rack of claim 9 wherein:

said left posts are spaced such that, with both holders in the folded position, each said left post overlies its corresponding said right post.

11. The folding rack of claim 9 further including:

a low resilient flap attached to a said post distal from said post upper end and projecting across an adjacent said channel toward an adjacent said post for holding a glass panel that is shorter in height than said post in said adjacent channel snugly against said adjacent post.

12. The folding rack of claim 9 further including:

a plurality of high resilient flaps; each resilient flap being attached near the top of a said post and projecting across the top of an adjacent said channel toward an adjacent said post for holding a glass panel in said adjacent channel snugly against said adjacent post.

13. The folding rack of claim 12 further including:

a low resilient flap attached to a said post distal from said post upper end and projecting across an adjacent said channel toward an adjacent said post for holding a glass panel that is shorter in height than said post in said adjacent channel snugly against said adjacent post.

14. The folding rack of claim 10 further including:

a low resilient flap attached to a said post distal from said post upper end and projecting across an adjacent said channel toward an adjacent said post for holding a glass panel that is shorter in height than said post in said adjacent channel snugly against said adjacent post.

15. The folding rack of claim 10 further including:

a plurality of high resilient flaps; each resilient flap being attached near the top of a said post and projecting across the top of an adjacent said channel toward an adjacent said post for holding a glass panel in said adjacent channel snugly against said adjacent post.

16. The folding rack of claim 15 further including:

a low resilient flap attached to a said post distal from said post upper end and projecting across an adjacent said channel toward an adjacent said post for holding a glass panel that is shorter in height than said post in said adjacent channel snugly against said adjacent post.

* * * * *